US010715959B2

(12) United States Patent
Begeja et al.

(10) Patent No.: US 10,715,959 B2
(45) Date of Patent: *Jul. 14, 2020

(54) GENERATING A PRE-CACHING SCHEDULE BASED ON FORECASTED CONTENT REQUESTS

(71) Applicant: AT&T INTELLECTUAL PROPERTY I, L.P., Atlanta, GA (US)

(72) Inventors: Lee Begeja, Gillette, NJ (US); David Crawford Gibbon, Lincroft, NJ (US); Raghuraman Gopalan, Union City, CA (US); Zhu Liu, Marlboro, NJ (US); Yadong Mu, Middleton, NJ (US); Bernard S. Renger, New Providence, NJ (US); Behzad Shahraray, Holmdel, NJ (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,831

(22) Filed: Oct. 3, 2018

(65) Prior Publication Data

US 2019/0037359 A1 Jan. 31, 2019

Related U.S. Application Data

(63) Continuation of application No. 15/078,867, filed on Mar. 23, 2016, now Pat. No. 10,117,058.

(51) Int. Cl.
*H04W 4/02* (2018.01)
*H04L 29/08* (2006.01)
(Continued)

(52) U.S. Cl.
CPC ......... *H04W 4/025* (2013.01); *H04L 65/4076* (2013.01); *H04L 67/12* (2013.01);
(Continued)

(58) Field of Classification Search
CPC .... H04W 4/025; H04L 65/4076; H04L 67/32; H04L 67/18; H04L 67/12; H04L 67/2847
See application file for complete search history.

(56) References Cited

U.S. PATENT DOCUMENTS 7,451,205 B2 11/2008 Cheung et al.
8,682,340 B2 3/2014 Cormier et al.
(Continued)

FOREIGN PATENT DOCUMENTS

GB 2497412 B 5/2014
WO 2011091861 A1 8/2011
(Continued)

OTHER PUBLICATIONS

Komninos, Andreas, et al., "A calendar based Internet content pre-caching agent for small computing devices." Pers Ubiquit Comput DOI 10.1007/s0079-007-0153-4, Springer-Verlag London Limited 2007, 18 pages.

(Continued)

*Primary Examiner* — Kiet Tang
(74) *Attorney, Agent, or Firm* — Guntin & Gust, PLC; Matthew Tropper

(57) ABSTRACT

A method includes accessing, at a base station of a wireless communications network, information identifying a plurality of user devices in a coverage area of the base station. The method includes determining a forecasted content request for media content at a particular time for delivery to a first user device of the plurality of user devices based on media consumption data for the first user device. The method includes receiving, from a second user device of the plurality (Continued)

of user devices, a request for the media content at a time before the particular time. The method includes sending an instruction to the first user device that directs the first user device store the media content received via a multicast transmission of the media content. The method also includes sending the media content via the multicast transmission to the first user device and to the second user device responsive to the request.

20 Claims, 9 Drawing Sheets

(51) Int. Cl.
*G06F 15/167* (2006.01)
*H04L 29/06* (2006.01)
*H04J 11/00* (2006.01)

(52) U.S. Cl.
CPC .......... *H04L 67/18* (2013.01); *H04L 67/2847* (2013.01); *H04L 67/32* (2013.01)

(56) References Cited

U.S. PATENT DOCUMENTS

| | | |
|---|---|---|
| 8,849,942 B1 | 9/2014 | Foster et al. |
| 8,924,503 B2 | 12/2014 | Brech |
| 9,058,324 B2 | 6/2015 | Kohlenberg et al. |
| 2011/0288936 A1 | 11/2011 | Cumming |
| 2012/0023226 A1 | 1/2012 | Petersen et al. |
| 2013/0132544 A1 | 5/2013 | Krishnan et al. |
| 2013/0151652 A1* | 6/2013 | Brech .................. G06F 15/167 709/216 |
| 2013/0267254 A1 | 10/2013 | Zhang |
| 2014/0199980 A1 | 7/2014 | Rao et al. |
| 2014/0325025 A1* | 10/2014 | Yeleswarapu ........... H04L 63/10 709/219 |
| 2014/0379835 A1* | 12/2014 | Foerster .............. H04L 67/2847 709/213 |
| 2015/0049602 A1 | 2/2015 | Gavita et al. |
| 2015/0222681 A1 | 8/2015 | Basile |
| 2015/0286571 A1 | 10/2015 | Cain, III et al. |
| 2017/0026468 A1* | 1/2017 | Kumar ................ H04L 67/1095 |
| 2017/0238272 A1* | 8/2017 | You ..................... H04J 11/0073 370/350 |

FOREIGN PATENT DOCUMENTS

| | | |
|---|---|---|
| WO | 2014004264 A1 | 1/2014 |
| WO | 2015051849 A1 | 4/2015 |

OTHER PUBLICATIONS

O'Grady, Michael, et al., "Mobile Multimedia: Reflecting on Dynamic Service Provision", Preprint submitted to International Journal of Ambient Computing and Intelligence , Mar. 31, 2010, 29 pages.

* cited by examiner

GENERATING A PRE-CACHING SCHEDULE BASED ON FORECASTED CONTENT REQUESTS

This application claims priority from, and is a continuation of, U.S. patent application Ser. No. 15/078,867, filed Mar. 23, 2016, which is incorporated herein by reference in its entirety.

FIELD OF THE DISCLOSURE

The present disclosure is generally related to generating a pre-caching schedule based on forecasted content requests.

BACKGROUND

Mobile devices may be used to receive streamed media content. A mobile device receiving streamed media content may roam. For example, a mobile device may move from a first coverage area of a first base station to a second coverage area of a second base station. Multiple mobile devices may stream data from the second base station at different times. For example, a first device may request data at a first request time that is subsequent to a second request time that a second device requests the data. During busy traffic periods, the second base station may be too busy to stream the same data at different times to each of the mobile devices within the second coverage area, resulting in data stream interruption. Interruptions in streaming of media content may adversely impact the user experience.

DETAILED DESCRIPTION

Figure 1:
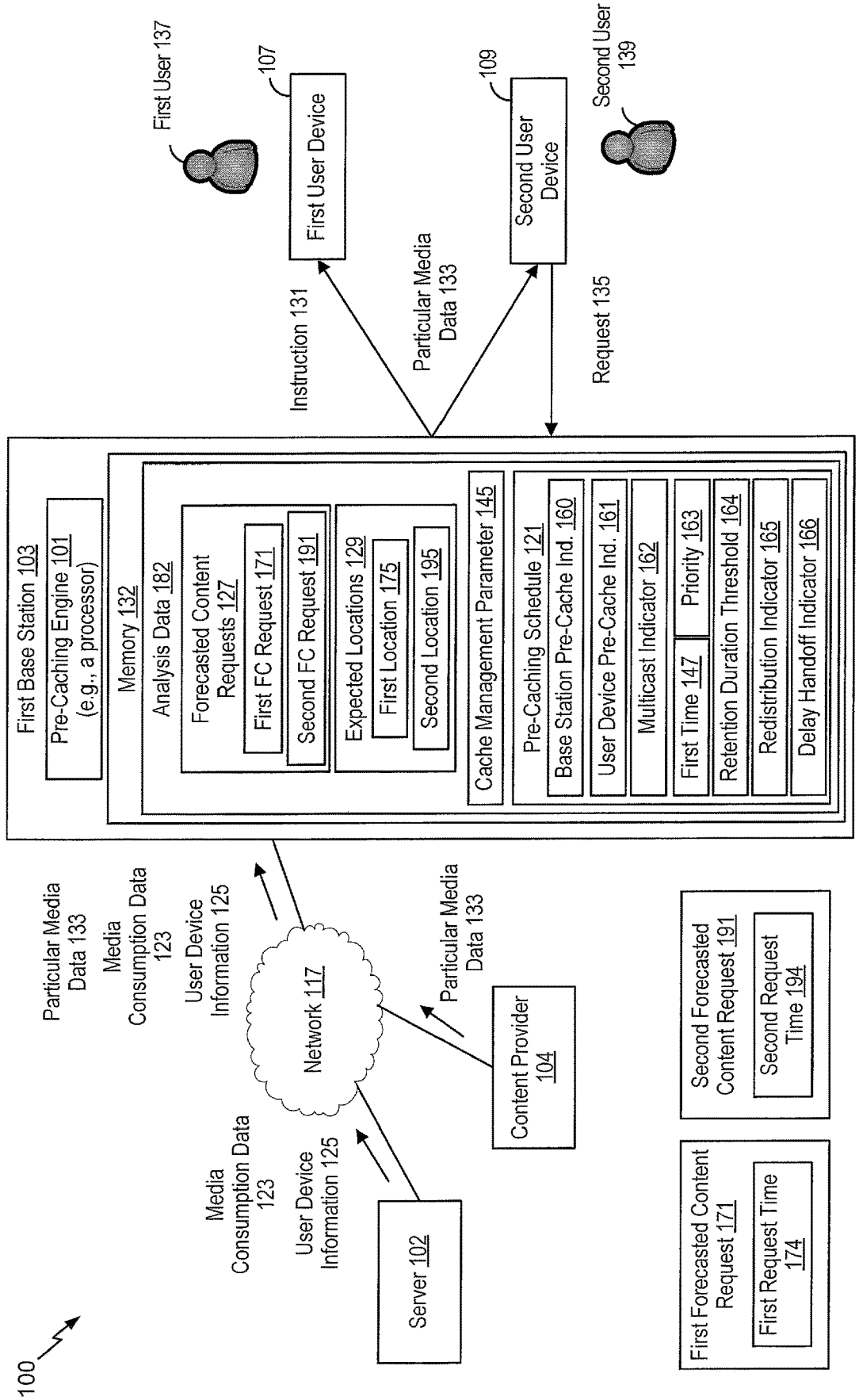
FIG. 1 is a diagram of a particular illustrative example of a system that generates a pre-caching schedule based on forecasted content requests.

Systems and methods of pre-caching schedule generation based on forecasted content requests are disclosed. A pre-caching engine may have access to user device information identifying a plurality of user devices within a particular coverage area of a wireless communication network. The pre-caching engine may determine expected locations of the plurality of user devices during a particular time period (e.g., next half an hour) based on the user device information. For example, the user device information may indicate that a first user device is detected at a first location at a first time and is heading towards a particular destination. To illustrate, the user device information may include navigation information indicating the particular destination, user calendar information indicating the particular destination, or both. In a particular aspect, a user of the first user device may provide the navigation information to a navigation application of the first user device to generate directions to the particular destination. The navigation application may provide the navigation information to a server. The pre-caching engine may receive the user device information including the navigation information from the server. In a particular aspect, the first user device may be associated with a user account of the user. The user account may also be associated with user calendar information of the user. For example, the user may update the user calendar information from the first user device or another device. The server may have access to the user calendar information corresponding to the user account. The pre-caching engine may receive the user calendar information from the server.

The pre-caching engine may, based on the user device information, determine a first expected location of the first user device during a first time period. For example, the first expected location may correspond to a coverage area of a first base station. To illustrate, the pre-caching engine may, based on the user device information, determine that the first user device is expected to be within the coverage area during the first time period. Similarly, the pre-caching engine may, based on the user device information, determine that a second user device is expected to be within the coverage area during a second time period that overlaps the first time period.

The pre-caching engine may have access to media consumption data associated with the plurality of user devices. The pre-caching engine may determine forecasted content requests based on the media consumption data. For example, a first forecasted content request of the forecasted content requests may indicate that the first user device is expected to request particular media data at a first request time and that the second user device is expected to request the same media data at a second request time.

The pre-caching engine may generate a pre-caching schedule of content based on the forecasted content requests. For example, the pre-caching schedule may indicate that the first base station is to provide the particular media data to the first user device prior to the first request time. To illustrate, the pre-caching engine may determine that the first request time is subsequent to the second request time. The pre-caching engine may determine that the first user device and the second user device are expected to be within the coverage area of the first base station at the second request time. The pre-caching schedule may indicate that, in response to a request from the second user device, the particular media data is to be provided via a multicast transmission to the first user device and the second user device. The pre-caching engine may send an instruction to the first user device directing the first user device to store the particular media data. The first user device may receive the particular media data prior to sending a request for the particular media data. During regular operation (e.g., when an instruction to store data is not received prior to receiving the data), the first user device may retain data that is received responsive to a request and may discard data that is received without sending a request. The instruction may direct the first user device to refrain from discarding the particular media data. The pre-caching engine may, in response to receiving the request from the second user device, send the particular media data via the multicast transmission to the first user device and the second user device. The second user device may display the particular media data upon receipt. The first user device may pre-cache the particular media data by storing the particular media data in a memory. The first user device may display the particular media data in response to receiving a user request. The pre-caching engine may provide the particular media data to the first user device and to the second user device at the same time.

The base station may be configured to participate in at most a threshold number of transmissions during a time period. During busy traffic periods, the base station may participate in a number of transmissions during a time period and the number of transmissions may satisfy (e.g., be equal to) the threshold number of transmissions. The base station may be unable to participate in an additional transmission to send the particular media data to the first user device responsive to a request from the first user device.

The base station may provide the particular media data to the first user device prior to the first request time. The first user device may be within a coverage area of the base station for a relatively short duration as the first user device moves from one coverage area to another coverage area. For example, a large portion of the duration that the first user device is within the coverage area of the base station may correspond to a busy traffic period. Multicasting the particular media data to multiple user devices may enable the base station to provide the particular media data to the multiple user devices using a single transmission. For example, the number of transmissions in which the base station is participating may include a transmission of the particular media data to the second user device. The base station may provide the particular media data, via a multicast transmission, to the first user device and to the second user device without exceeding the threshold number of transmissions during the busy traffic period, thereby preventing a data stream interruption at the first user device.

In a particular aspect, a method includes accessing, at a device, information identifying a plurality of user devices within a particular coverage area of a wireless communication network. The method also includes accessing, at the device, media consumption data indicating content requests corresponding to the plurality of user devices. The method further includes determining, at the device, expected locations of the plurality of user devices based on the information. The method also includes determining, at the device, forecasted content requests associated with the plurality of user devices based on the media consumption data. The method further includes generating, at the device, a pre-caching schedule of content based on the forecasted content requests and the expected locations. The method also includes determining, at the device, that the pre-caching schedule indicates that particular media data is to be provided via a multicast transmission to a first user device and to a second user device of the plurality of user devices. The method further includes sending an instruction from the device to the first user device. The instruction directs the first user device to store the particular media data. The method also includes sending the particular media data via the multicast transmission to the first user device and to the second user device. The particular media data is sent responsive to a request from the second user device.

In another aspect, an apparatus includes an interface, a processor, and a memory. The memory stores instructions executable by the processor. The interface is configured to receive information identifying a plurality of user devices within a particular coverage area of a wireless communication network. The interface is also configured to receive media consumption data indicating content requests corresponding to the plurality of user devices. The instructions are executable by the processor to cause the processor to perform operations including determining expected locations of the plurality of user devices based on the information. The operations also include determining forecasted content requests associated with the plurality of user devices based on the media consumption data. The operations further include generating a pre-caching schedule of content based on the forecasted content requests and the expected locations. The operations also include determining that the pre-caching schedule indicates that particular media data is to be provided via a multicast transmission to a first user device and to a second user device of the plurality of user devices. The operations further include sending an instruction to the first user device. The instruction directs the first user device to store the particular media data. The operations also include sending the particular media data via the multicast transmission to the first user device and to the second user device. The particular media data is sent responsive to a request from the second user device.

In another aspect, a computer-readable storage device stores instructions that, when executed by a processor, cause the processor to perform operations including accessing information identifying a plurality of user devices within a particular coverage area of a wireless communication network. The operations also include determining, based on media consumption data, that a first user device of the plurality of user devices is expected to request particular media data at a first request time. The media consumption data indicates content requests corresponding to the plurality of user devices. The operations further include determining, based on the media consumption data, that a second user device of the plurality of user devices is expected to request the particular media data at a second request time that is prior to the first request time. The operations also include sending an instruction to the first user device. The instruction directs the first user device to store the particular media data. The operations further include sending the particular media data via a multicast transmission to the first user device and to the second user device. The particular media data is sent responsive to a request from the second user device.

Referring to FIG. 1, a particular illustrative aspect of a system is disclosed and generally designated 100. The system 100 includes a first base station 103. The system 100 (e.g., a wireless communication system) may include one or more base stations (e.g., the first base station 103) that are configured to support wireless communication for one or more user devices (e.g., a first user device 107, a second user device 109, or both). A user device (e.g., the first user device 107 or the second user device 109) may communicate with the first base station 103 via an uplink or a downlink. The downlink may refer to a communication link from the first base station 103 to the user device (e.g., the first user device 107 or the second user device 109) and the uplink may refer to a communication link from the user device to the first base station 103. The first base station 103 may have a backhaul (e.g., an internet backhaul) to a network server (e.g., a server 102, a content provider 104, or both).

The first base station 103 may be coupled, via a network 117, to the server 102. The first base station 103 may be coupled, via the network 117 (or another network), to a device of the content provider 104. The first base station 103 may include a pre-caching engine 101 (e.g., a processor) coupled to a memory 132. The memory 132 may include analysis data 182.

One or more operations described herein with reference to components, systems, devices, or methods may be performed by a base station, an access point, a server, a content provider, a computer, an appliance, a wireless device, a cellular device, a user device, an internet of things (IoT) device, a fixed location device, a mobile device, a femtocell device, a microcell device, a picocell device, a fifth generation (5G) device, or a combination thereof. For example, one or more operations performed by the pre-caching engine 101, the first base station 103, the server 102, the content provider 104, the first user device 107, the second user device 109, or a combination thereof, as described herein, may be performed by a base station, an access point, a server, a content provider, a computer, an appliance, a wireless device, a cellular device, a user device, an Internet of things (IoT) device, a fixed location device, a mobile device, a femtocell device, a microcell device, a picocell device, a fifth generation (5G) device, or a combination thereof. In a particular aspect, the pre-caching engine 101 may be included in a base station, an access point, a server, a content provider, a computer, an appliance, a wireless device, a cellular device, a user device, an internet of things (IoT) device, a fixed location device, a mobile device, a femtocell device, a microcell device, a picocell device, a fifth generation (5G) device, or a combination thereof.

In a particular aspect, one or more operations performed by the pre-caching engine 101, as described herein, may be performed by one or more devices of a distributed system. For example, the pre-caching engine 101 may be included in a device that controls operations of a plurality of base stations and micro cells. In a particular aspect, multiple devices may include pre-caching engines (e.g., copies of the pre-caching engine 101) that are configured to cooperate as a network and to share information.

At various times during operation, the analysis data 182 stored in the memory 132 may include one or more of expected locations 129, forecasted content requests 127, a pre-caching schedule 121, a cache management parameter 145, particular media data 133, media consumption data 123, user device information 125, or a combination thereof, as described herein. In a particular aspect, the pre-caching engine 101 may receive at least a portion of the analysis data 182 from a device, such as another pre-caching engine, a base station, an access point, a server, a content provider, a computer, an appliance, a wireless device, a cellular device, a user device, an internet of things (IoT) device, a fixed location device, a mobile device, a femtocell device, a microcell device, a picocell device, or a combination thereof. For example, the pre-caching engine 101 may receive the media consumption data 123, the user device information 125, the particular media data 133, or a combination thereof, as described herein. The pre-caching engine 101 may store the media consumption data 123, the user device information 125, the particular media data 133, or a combination thereof, as part of the analysis data 182 in the memory 132.

The pre-caching engine 101 may analyze the analysis data 182. For example, the pre-caching engine 101 may generate (or update) the expected locations 129, the forecasted content requests 127, the pre-caching schedule 121, the cache management parameter 145, or a combination thereof, based on analyzing the analysis data 182 (e.g., the media consumption data 123, the user device information 125, or both), as described herein.

In a particular aspect, the pre-caching engine 101 may be cooperating with one or more other pre-caching engines to generate an optimized solution for the network. The pre-caching engine 101 may provide (e.g., redistribute) at least a portion of the analysis data 182 (e.g., the expected locations 129, the forecasted content requests 127, the pre-caching schedule 121, the cache management parameter 145, the particular media data 133, the media consumption data 123, the user device information 125, or a combination thereof) to one or more other pre-caching engines. The pre-caching engine 101 may receive at least a portion of the analysis data 182 (e.g., the expected locations 129, the forecasted content requests 127, the pre-caching schedule 121, the cache management parameter 145, the particular media data 133, the media consumption data 123, the user device information 125, or a combination thereof) from one or more other pre-caching engines.

The first base station 103 may receive the user device information 125 from the server 102. In a particular aspect, the server 102 may periodically or occasionally send the user device information 125 to the first base station 103. In a particular aspect, the server 102 may, in response to receiving a request from the first base station 103, send the user device information 125 to the first base station 103. The first base station 103 may send the request in response to detecting a busy traffic period. For example, the pre-caching engine 101 may determine that the first base station 103 has participated in a number of transmissions over a time period. The pre-caching engine 101 may detect a busy traffic period in response to determining that the number of transmissions satisfies (e.g., exceeds) a threshold. The first base station 103 may send the request in response to detecting a busy traffic period. The user device information 125 may identify a plurality of user devices within a particular coverage area of a wireless communication network (e.g., the first base station 103, one or more additional base stations). The wireless communication network may include a plurality of base stations. The user device information 125 may identify user devices (if any) within a coverage area of each of the plurality of base stations (e.g., the first base station 103). The plurality of user devices may include the first user device 107 of a first user 137, the second user device 109 of a second user 139, or both. The user device information 125 may include location information corresponding to the plurality of user devices.

The pre-caching engine 101 may determine the expected locations 129 during a particular time period (e.g., next half an hour) of the plurality of user devices based on the user device information 125. For example, the pre-caching engine 101 may determine, based on the user device information 125, that the first user device 107 is expected to be at a first location 175 during a first time period. To illustrate, the user device information 125 may indicate that the first user device 107 is detected at a particular location at a first time and is heading in a first direction at an average speed. The user device information 125 may indicate a destination of the first user device 107. For example, the user device information 125 may include navigation data, calendar data, travel history, or a combination thereof, indicating the destination of the first user device 107. In a particular aspect, the first user 137 of the first user device 107 may provide the navigation information to a navigation application of the first user device 107 to generate directions to the particular destination. The navigation application may provide the navigation information to the server 102. The pre-caching engine 101 may receive the user device information 125 including the navigation information from the server 102. In a particular aspect, the first user device 107 may be associated with a user account of the first user 137. The user account may also be associated with user calendar information of the first user 137. For example, the first user 137 may update the user calendar information from the first user device 107 (or another device). The first user device 107 (or the other device) may provide the user calendar information corresponding to the user account to the server 102. The pre-caching engine 101 may receive the user device information 125 including the user calendar information from the server 102.

The pre-caching engine 101 may determine that the first user device 107 is expected to be at the first location 175 during the first time period based on the particular location, the first time, the first direction, the average speed, the destination, or a combination thereof. The first location 175 may correspond to a first coverage area of the first base station 103. For example, the pre-caching engine 101 may determine that the first user device 107 is expected to be within the first coverage area during the first time period. The pre-caching engine 101 may similarly determine that the second user device 109 is expected to be at a second location 195 during a second time period. For example, the pre-caching engine 101 may determine that the second user device 109 is expected to be within the first coverage area during the second time period.

The pre-caching engine 101 may receive, via the network 117, the media consumption data 123 from the server 102. The media consumption data 123 may indicate one or more media requests corresponding to each of the plurality of user devices. The media requests may correspond to data that was previously sent to the user device, data that is being sent to the user device, data that is scheduled to be sent to the user device, or a combination thereof. In a particular aspect, the server 102 may periodically send the media consumption data 123 to the first base station 103. In a particular aspect, the server 102 may, in response to receiving a request from the first base station 103, send the media consumption data 123 to the first base station 103. For example, the first base station 103 may, in response to detecting a busy traffic period, send the request to the server 102.

In a particular aspect, the user device information 125 may be received from a first device (e.g., a first server) and the media consumption data 123 may be received from another device (e.g., another server). The pre-caching engine 101 may, based on the media consumption data 123, determine the forecasted content requests 127 of the plurality of user devices. For example, the pre-caching engine 101 may determine, based on the media consumption data 123, a first forecasted content (FC) request 171 indicating that the first user device 107 is expected to request the particular media data 133 at a first request time 174. To illustrate, the media consumption data 123 may indicate that the first user device 107 is streaming data at the first time. The first user device 107 may have requested first data at the first time. The first data may be associated with a media stream. A manifest may identify media chunks of the media stream in sequential order. The media consumption data 123 may include the manifest and may indicate that the first user device 107 has requested the first data corresponding to a first media chunk of the media stream. The manifest may indicate that a second media chunk is subsequent to the first media chunk in the media stream. The pre-caching engine 101 may determine that the first user device 107 is expected to request the particular media data 133 corresponding to the second media chunk. For example, the pre-caching engine 101 may determine that the first user device 107 is expected to request the particular media data 133 at the first request time 174 based on the first time and a playback duration of each media chunk.

The manifest may indicate that media stream includes a first number (e.g., 50) of media chunks subsequent to the first media chunk and the playback duration (e.g., 1 minute) of each media chunk. The pre-caching engine 101 may determine a request time associated with each media chunk (e.g., request time of Nth media chunk=first time+N*(playback duration of each media chunk)). The pre-caching engine 101 may determine an expected location of the first user device 107 at each of the requested times based on the user device information 125. For example, the pre-caching engine 101 may determine a vector based on a speed and a direction of the first user device 107. The pre-caching engine 101 may determine an expected location at a request time based on a detected location of the first user device 107 at a first time, a difference between the request time and the first time, and the vector.

In a particular aspect, the media consumption data 123 may indicate that the first user device 107 requests the particular media data 133 at approximately a first time (e.g., 6 PM) on weekdays. The first request time 174 may correspond to the first time on a weekday. The pre-caching engine 101 may similarly determine a second FC request 191 indicating that the second user device 109 is expected to request the particular media data 133 at a second request time 194.

The pre-caching engine 101 may generate the pre-caching schedule 121, as further described with reference to FIGS. 2-6, based on the forecasted content requests 127, the expected locations 129, available memory, network availability, or a combination thereof. The pre-caching schedule 121 may include a base station pre-cache indicator 160 indicating whether the particular media data 133 is to be pre-cached at the first base station 103, as described with reference to FIG. 2. The pre-caching schedule 121 may indicate a retention duration threshold 164 associated with the particular media data 133, as described with reference to FIG. 2.

The pre-caching schedule 121 may include a user device pre-cache indicator 161 indicating whether the particular media data 133 is to be pre-cached at a user device (e.g., the first user device 107, the second user device 109, or both), as described with reference to FIG. 3. The pre-caching schedule 121 may indicate a first time 147 at (or by) which the particular media data 133 is to be requested from the content provider 104, as described with reference to FIG. 3.

The pre-caching schedule 121 may include a delay handoff indicator 166 indicating whether the first base station 103 is to delay handoff of a user device to another base station, as described with reference to FIG. 4. The pre-caching schedule 121 may include a multicast indicator 162 indicating whether the particular media data 133 is to be sent, via a multicast transmission, to a plurality of user devices (e.g., the first user device 107 and the second user device 109), as described with reference to FIG. 5.

The pre-caching schedule 121 may include a redistribution indicator 165 indicating whether the particular media data 133 is to be re-distributed from a user device to another user device, as described with reference to FIG. 6. The pre-caching schedule 121 may indicate a priority 163 associated with the particular media data 133, as described with reference to FIG. 7.

The pre-caching engine 101 may, based on the pre-caching schedule 121, send a request at a particular time to the content provider 104. For example, the pre-caching engine 101 may, in response to determining at a particular time that the pre-caching schedule 121 indicates the first time 147 and that the particular time is less than or equal to the first time 147, send the request to the content provider 104. In a particular aspect, the pre-caching engine 101 may send the request to the content provider 104 in response to determining, at a particular time, that a difference between the particular time and the first time 147 is within a threshold. In a particular aspect, the pre-caching engine 101 may send the request based on the first time 147, the priority 163, or both. For example, the pre-caching schedule 121 may indicate a second time, a second priority, or both, associated with second media data. The pre-caching engine 101 may, at a particular time, send the request in response to determining that the particular time is prior to the first time 147 and prior to the second time, and that the priority 163 is greater than the second priority. The priority 163 may be based on a likelihood that the second user device 109 will request the particular media data 133 at the second request time 194, a likelihood that the second user device 109 will be within the first coverage area of the first base station 103 at the second request time 194, a likelihood that the first user device 107 will request the particular media data 133 subsequent to the second request time 194, a likelihood that the first user device 107 will be within the first coverage area of the first base station 103 at the second request time 194, or a combination thereof. The content provider 104 may send the particular media data 133 to the first base station 103 responsive to the request.

The pre-caching engine 101 may pre-cache the particular media data 133 at the first base station 103 based on the pre-caching schedule 121. For example, the pre-caching engine 101 may store the particular media data 133 at the memory 132 in response to determining that the base station pre-cache indicator 160 indicates that the particular media data 133 is to be pre-cached at the first base station 103, that the user device pre-cache indicator 161 indicates that the particular media data 133 is to be pre-cached at a user device, or both.

The pre-caching engine 101 may set (or modify) the cache management parameter 145 associated with the particular media data 133 based on the pre-caching schedule 121. For example, the pre-caching engine 101 may set the cache management parameter 145 in response to receiving the particular media data 133 from the content provider 104. As another example, the pre-caching engine 101 may modify the cache management parameter 145 in response to determining that the particular media data 133 is stored in the memory 132. To illustrate, the particular media data 133 may have been previously received from the content provider 104 or from another source. The pre-caching engine 101 may store the cache management parameter 145 at the memory 132. The cache management parameter 145 may be stored with a reference to the particular media data 133. Alternatively, or in addition, the particular media data 133 may be stored with a reference to the cache management parameter 145. The cache management parameter 145 may indicate the retention duration threshold 164. The first base station 103 may perform memory management based on the cache management parameter 145. For example, the first base station 103 (e.g., a cache memory manager) may refrain from marking the particular media data 133 for deletion in response to determining that the retention duration threshold 164 indicated by the cache management parameter 145 is unexpired.

The pre-caching engine 101 may initiate transmission of the particular media data 133 based on the pre-caching schedule 121, as described herein. The pre-caching engine 101 may determine that the user device pre-cache indicator 161 indicates that the particular media data 133 is not to be pre-cached at the second user device 109. For example, the pre-caching schedule 121 may indicate that the particular media data 133 is to be sent to the second user device 109 responsive to a request 135 from the second user device 109. The pre-caching engine 101 may, in response to determining that the user device pre-cache indicator 161 indicates that the particular media data 133 is not to be pre-cached at the second user device 109, initiate transmission of the particular media data 133 to the second user device 109 responsive to the request 135 from the second user device 109.

The pre-caching engine 101 may determine that the user device pre-cache indicator 161 indicates that the particular media data 133 is to be pre-cached at the first user device 107. For example, the pre-caching schedule 121 may indicate that the particular media data 133 is to be sent to the first user device 107 prior to the first request time 174. The pre-caching engine 101 may, in response to determining at a particular time that the user device pre-cache indicator 161 indicates that the particular media data 133 is to be pre-cached at the first user device 107, that the particular time is prior to the first request time 174, and that the first user device 107 is within a first coverage area of the first base station 103, initiate transmission of the particular media data 133 to the first user device 107. In a particular aspect, the pre-caching engine 101 may, prior to transmission of the particular media data 133, initiate transmission of an instruction 131 to the first user device 107. The instruction 131 may direct the first user device 107 to pre-cache (e.g., store) the particular media data 133. The first user device 107 may receive the particular media data 133 prior to sending a request for the particular media data 133. During regular operation (e.g., when an instruction to store data is not received prior to receiving the data), the first user device 107 may retain data that is received responsive to a request and may discard data that is received without sending a request. The instruction 131 may direct the first user device 107 to refrain from discarding the particular media data 133.

The pre-caching engine 101 may send the particular media data 133, via a multicast transmission, to a plurality of user devices based on the pre-caching schedule 121. For example, the pre-caching engine 101 may determine that the multicast indicator 162 indicates that the particular media data 133 is to be sent, via a multicast transmission, to the first user device 107 and to the second user device 109. The multicast indicator 162 may indicate that the particular media data 133 is to be sent via the multicast transmission in response to receiving the request 135 from the second user device 109. Alternatively, the pre-caching engine 101 may, in response to determining that the multicast indicator 162 indicates that the particular media data 133 is to be sent via a multicast transmission to the first user device 107 and to the second user device 109, and that the user device pre-cache indicator 161 indicates that the particular media data 133 is to be pre-cached at the first user device 107 and that the particular media data 133 is not to be pre-cached at the second user device 109, determine that the particular media data 133 is to be sent via the multicast transmission to the first user device 107 and to the second user device 109 responsive to receiving the request 135 from the second user device 109. The second user device 109 may send the request 135 responsive to a user request for the particular media data 133. In a particular aspect, the second user device 109 may send the request 135 in response to determining that a first video chunk is being displayed and that the particular media data 133 corresponds to a second video chunk that is subsequent to the first video chunk in a data stream. The pre-caching engine 101 may initiate a multicast transmission of the particular media data 133 to the first user device 107 and to the second user device 109 responsive to receiving the request 135 from the second user device 109. The first user device 107 may pre-cache the particular media data 133. For example, the first user device 107 may receive the particular media data 133 prior to receiving a user request for the particular media data. The first user device 107 may provide the particular media data 133 from the memory to a display responsive to the user request for the particular media data 133. The first user device 107 may refrain from sending a request to a base station for the particular media data 133 responsive to the user request.

The pre-caching engine 101 may determine, based on the pre-caching schedule 121, whether the particular media data 133 is to be redistributed from a user device (e.g., the first user device 107, the second user device 109, or both) to another user device. For example, the pre-caching engine 101 may determine that the redistribution indicator 165 indicates that the first user device 107 is to provide the particular media data 133 to a particular user device when the particular user device is within a coverage area of the first user device 107. The pre-caching engine 101 may send an instruction to the first user device 107 to pre-cache (e.g., store) the particular media data 133 until after a request time associated with the particular user device. The pre-caching engine 101 may send an instruction to the first user device 107 to provide the particular media data 133 to the particular user device when the particular user device is within a coverage area of the first user device 107. The first user device 107 may, in response to detecting that the particular user device is within a coverage area of the first user device 107, provide the particular media data 133 to the particular user device. In a particular aspect, the first base station 103 may, in response to receiving a request from the particular user device, send an instruction to the first user device 107 to provide the particular media data 133 to the particular user device. The first user device 107 may, in response to receiving the instruction, provide the particular media data 133 to the particular user device.

The pre-caching engine 101 may delay handoff of a user device (e.g., the first user device 107, the second user device 109, or both) based on the pre-caching schedule 121. For example, the pre-caching engine 101 may determine that the delay handoff indicator 166 indicates that the first base station 103 is to delay handoff of the first user device 107 to a second base station is to be delayed until after the first request time 174. During regular operation (e.g., when the handoff is not to be delayed), the first base station 103 may handoff the first user device 107 to the second base station when the user device receives a stronger signal from the second base station than from the first base station 103. The first base station 103 may, based on the delay handoff indicator 166, delay handoff of the first user device 107 to the second base station until after the first request time 174 as long as the first user device 107 receives a signal from the first base station 103. In a particular aspect, when the second base station is busy, the first user device 107 may experience lower data latency via the weaker signal from the first base station 103 than via the stronger signal from the second base station.

In a particular use case, the first user device 107 and the second user device 109 may be within a first coverage area of the first base station 103. The first user device 107 may be streaming the same media steam as the second user device 109 but the first user device 107 may be out of sync with the second user device 109. For example, the second user device 109 may stream the particular media data 133 at a particular request time and the first user device 107 may stream the particular media data 133 with a delay subsequent to the particular request time. The pre-caching engine 101 may, based on the pre-caching schedule 121, stream the particular media data 133 to the second user device 109 and have the second user device 109 redistribute the particular media data 133 to the first user device 107. In an alternate implementation, the pre-caching engine 101 may, via a multicast transmission, stream the particular media data 133 to the second user device 109 and pre-cache the particular media data 133 at the first user device 107.

The system 100 may enable the pre-caching engine 101 to dynamically pre-cache the particular media data 133 at a base station, at a user device, or both, based on forecasted content requests and estimated locations. The pre-caching engine 101 may provide the particular media data 133 via a multicast transmission to multiple user devices at the same time.

Figure 2:
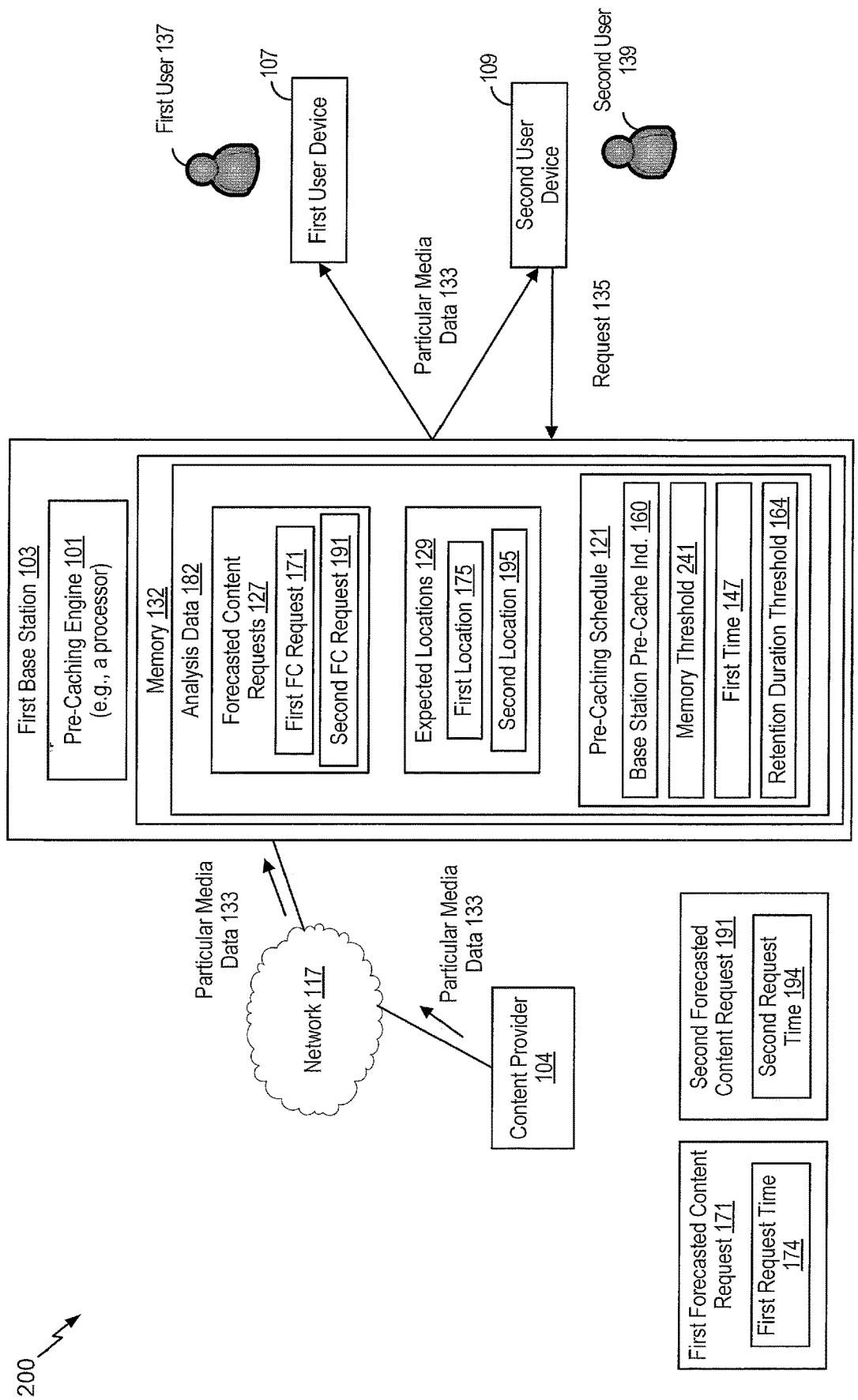
FIG. 2 is a diagram of another example of a system that generates a pre-caching schedule based on forecasted content requests.

Referring to FIG. 2, a particular illustrative aspect of a system is disclosed and generally designated 200. The system 200 may correspond to the system 100 of FIG. 1. For example, the system 100 may include one or more components of the system 200.

During operation, the pre-caching engine 101 may generate (or update) the pre-caching schedule 121 based on the forecasted content requests 127, the expected locations 129, or both, as described herein. The pre-caching engine 101 may determine, based on available memory, whether the particular media data 133 is to be pre-cached at the first base station 103. For example, the pre-caching engine 101 may determine, based on the second FC content request 191, that the second user device 109 is expected to request the particular media data 133 at the second request time 194. The pre-caching engine 101 may, in response to determining that space available at the memory 132 associated with the first base station 103 satisfies a memory threshold 241, indicate in the pre-caching schedule 121 that the particular media data 133 is to be pre-cached at the first base station 103. For example, the base station pre-cache indicator 160 may indicate that the particular media data 133 is to be pre-cached (e.g., stored) at the memory 132 prior to the second request time 194.

In a particular aspect, the pre-caching schedule 121 may indicate a time at which the first base station 103 is to request the particular media data 133 from the content provider 104 to be pre-cached at the first base station 103. For example, the pre-caching schedule 121 may indicate that the first base station 103 is to request the particular media data 133 from the content provider 104 prior to, or approximately at, the first time 147. The first time 147 may be prior to the second request time 194. The pre-caching engine 101 may generate the retention duration threshold 164 indicating that the particular media data 133 is to be retained in the memory 132 until at least the second request time 194.

The pre-caching engine 101 may determine, based on a priority associated with the second FC request 191, the first time 147 that the particular media data 133 is to be requested from the content provider 104. The priority may be based on a likelihood that the second user device 109 will request the particular media data 133, a likelihood that the second user device 109 will be within a first coverage area of the first base station 103, or both. A difference between the first time 147 and the second request time 194 may be based on the priority. For example, the difference may be greater when particular media data 133 has higher priority.

In a particular aspect, the pre-caching engine 101 may, in response to determining that the space available at the memory 132 fails to satisfy the memory threshold 241, indicate in the pre-caching schedule 121 that the particular media data 133 is not to be pre-cached at the first base station 103. For example, the base station pre-cache indicator 160 may indicate that the particular media data 133 is to be requested from the content provider 104 responsive to the request 135 from the second user device 109.

In a particular use case, the second user device 109 may be expected to request the particular media data 133 at the second request time 194 (e.g., on Monday at 8 AM). The pre-caching engine 101 may, in response to determining that space available at the memory 132 associated with the first base station 103 satisfies the memory threshold 241, indicate in the pre-caching schedule 121 that the particular media data 133 is to be pre-cached at the first base station 103. For example, the pre-caching schedule 121 may indicate that the particular media data 133 is to be pre-cached at the first base station 103 prior to the second request time 194 (e.g., prior to Monday at 8 AM). In a particular aspect, the pre-caching engine 101 may determine that receiving traffic via the network 117 from the content provider 104 during the first time 147 (e.g., on Monday between 2 AM and 4 AM) costs less, balances network traffic, or both. The pre-caching schedule 121 may indicate that the first base station 103 is to request the particular media data 133 from the content provider 104 during the first time 147 (e.g., Monday 2 AM-4 AM). The pre-caching engine 101 may generate the retention duration threshold 164 indicating that the particular media data 133 is to be retained in the memory 132 until at least the second request time 194. In a particular aspect, the retention duration threshold 164 may indicate that the particular media data 133 is to be retained in the memory 132 until a second time (e.g., Monday at 8:15 AM) that is subsequent to the second request time 194. The second time may be based on the second request time 194 and an error margin.

The system 200 may thus enable the particular media data 133 to be pre-cached at the first base station 103 based on available memory. The pre-cached data may reduce a latency associated with providing the particular media data 133 to the second user device 109 responsive to the request 135. For example, the first base station 103 may initiate transmission of the particular media data 133 upon receipt of the request 135 without waiting to receive the particular media data 133 from the content provider 104 because the particular media data 133 is pre-cached at the memory 132.

Figure 3:
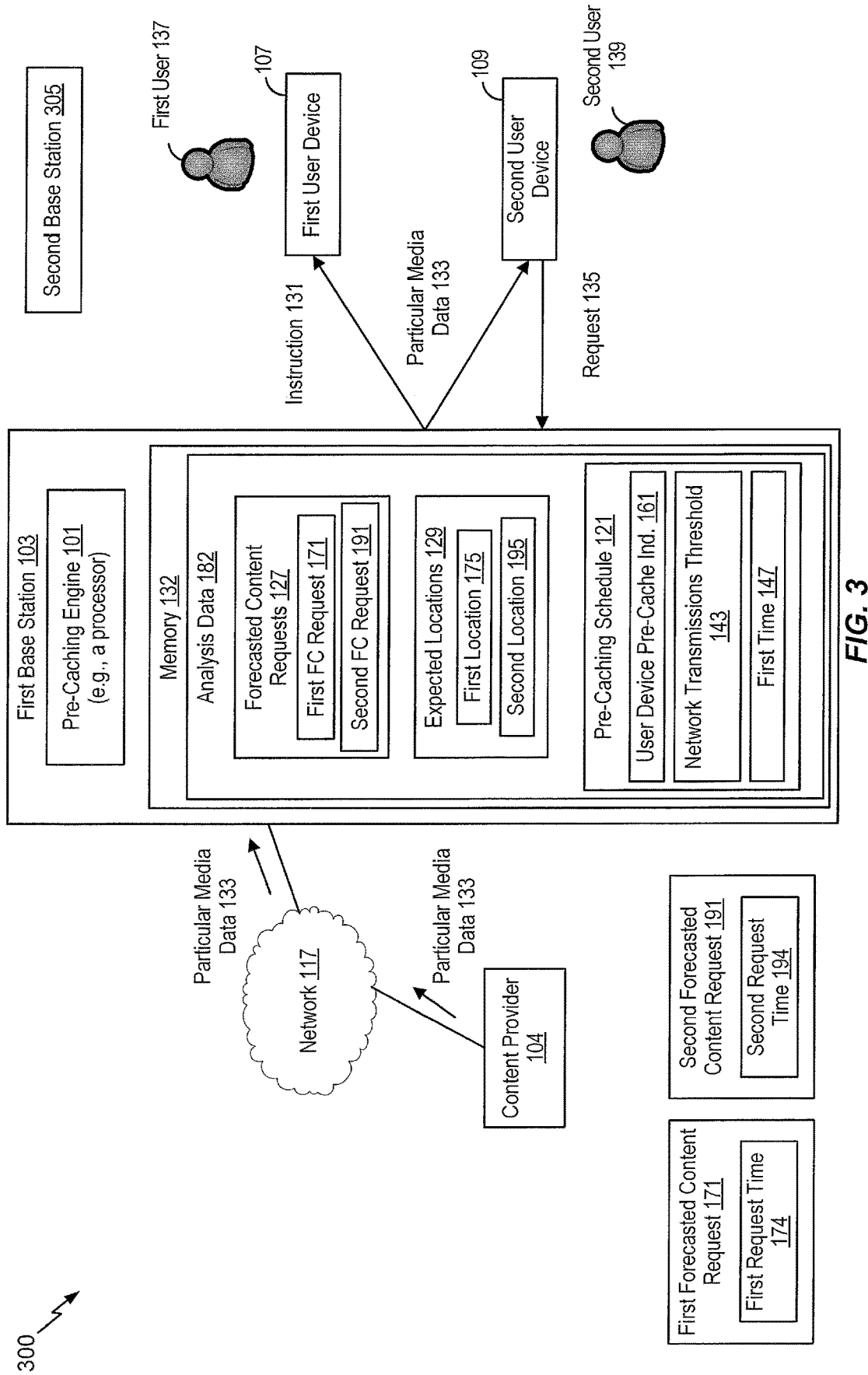
FIG. 3 is a diagram of another example of a system that generates a pre-caching schedule based on forecasted content requests.

Referring to FIG. 3, a particular illustrative aspect of a system is disclosed and generally designated 300. The system 300 may correspond to the system 100 of FIG. 1. For example, the system 100 may include one or more components of the system 300. The system 300 may include a second base station 305.

During operation, the pre-caching engine 101 may generate (or update) the pre-caching schedule 121 based on the forecasted content requests 127, the expected locations 129, or both, as described herein. The pre-caching engine 101 may determine whether to pre-cache the particular media data 133 at a user device (e.g., the second user device 109) based on network availability. For example, the pre-caching engine 101 may determine, based on the forecasted content requests 127 and the expected locations 129, that the first base station 103 is expected to participate in a number of transmissions at the second request time 194. To illustrate, the pre-caching engine 101 may determine, based on the expected locations 129, that a first number of user devices are expected to be within the first coverage area of the first base station 103 at the second request time 194.

The first base station 103 may participate in transmissions with a subset of the first user devices within the first coverage area at approximately the second request time 194. The pre-caching engine 101 may determine an expected number of transmissions based on the forecasted content requests 127, the pre-caching schedule 121, or both. For example, the pre-caching engine 101 may determine that the first base station 103 is expected to participate in a number of transmissions with a subset of the first number of user devices at the second request time 194.

The pre-caching engine 101 may determine, based on the pre-caching schedule 121, the forecasted content requests 127, or both, that the first base station 103 is expected to participate in a transmission with a first particular user device at approximately the second request time 194. For example, the pre-caching schedule 121 may indicate that the first base station 103 is to provide first data to a first particular user device responsive to receiving a request from the first particular user device and that the first particular user device is expected to request the first data at approximately the second request time 194. In this example, the pre-caching engine 101 may determine that the first base station 103 is expected to participate in a transmission with the first particular user device at approximately the second request time 194. As another example, the pre-caching schedule 121 may indicate that the first base station 103 is to provide the first data, via a multicast transmission, to a first particular user device in response to receiving a request from a second particular user device. In this example, the pre-caching engine 101 may determine that the first base station 103 is expected to participate in a transmission with the first particular user device, the second particular user device, or both, at approximately the second request time 194. In a particular aspect, the pre-caching engine 101 may count a multicast transmission as a single transmission. In an alternate aspect, the pre-caching engine 101 may determine a number of transmissions based on a count of destination devices of the multicast transmission.

The pre-caching engine 101 may, in response to determining that the number of transmissions satisfies (e.g., is less than) the network transmissions threshold 143, indicate in the pre-caching schedule 121 that the particular media data 133 is not to be pre-cached at the second user device 109. For example, the user device pre-cache indicator 161 may indicate that the particular media data 133 is to be transmitted to the second user device 109 responsive to the request 135 from the second user device 109. The pre-caching schedule 121 may also indicate, based on the second FC request 191, that the request 135 is expected to be received at the second request time 194.

In a particular aspect, the pre-caching engine 101 may, in response to determining that the number of transmissions fails to satisfy (e.g., is greater than or equal to) the network transmission threshold 143, indicate in the pre-caching schedule 121 that the particular media data 133 is to be pre-cached at the second user device 109. For example, the user device pre-cache indicator 161 may indicate that the particular media data 133 is to be transmitted to the second user device 109 prior to the second request time 194.

The first base station 103 may receive the request 135 when the particular media data 133 is not pre-cached at the second user device 109. For example, the second user device 109 may receive a user request for the particular media data 133 or may determine that a first video chunk is being displayed and the particular media data 133 corresponds to a second video chunk that is subsequent to the first video chunk in a data stream. The second user device 109 may determine whether the particular media data 133 is pre-cached in a memory associated with the second user device 109. The second user device 109 may, in response to determining that the particular media data 133 is pre-cached, provide the particular media data 133 from the memory to a display and may refrain from sending the request 135 to the first base station 103. Alternatively, the second user device 109 may, in response to determining that the particular media data 133 is not pre-cached in the memory, send the request 135 to the first base station 103, receive the particular media data 133 responsive to the request 135, and provide the particular media data 133 to the display.

The pre-caching engine 101 may determine whether the particular media data 133 is to be pre-cached at a user device (e.g., the first user device 107) based on an expected unreachability of the user device. For example, the pre-caching engine 101 may determine, based on the expected locations 129, that the first user device 107 is expected to be unreachable during a first time period. The first request time 174 may occur during the first time period. To illustrate, the pre-caching engine 101 may determine that the first user device 107 is expected to be unreachable during the first time period in response to determining that the expected locations 129 indicate that the first user device 107 is expected to be outside a coverage area of base stations during the first time period. The pre-caching engine 101 may, in response to determining that the first user device 107 is expected to be unreachable during the first time period, that the first request time 174 occurs during the first time period, and that the first user device 107 is expected to be within the first coverage area prior to the first time period, indicate in the pre-caching schedule 121 that the particular media data 133 is to be pre-cached at the first user device 107. For example, the user device pre-cache indicator 161 may indicate that the first base station 103 is to provide the particular media data 133 to the first user device 107 prior to the first request time 174 while the first user device 107 is within the first coverage area.

The pre-caching engine 101 may determine that the particular media data 133 is to be pre-cached at a user device (e.g., the first user device 107) based on determining that the user device is expected to be within a coverage area of a base station that is expected to be busy at a request time. For example, the expected locations 129 may indicate that the first user device 107 is expected to move from the first coverage area to the second coverage area of the second base station 305. The first user device 107 may be expected to remain within the second coverage area during a first time period. The pre-caching engine 101 may determine that the second base station 305 is expected to be busy during the first time period. For example, the pre-caching engine 101 may determine, based on the expected locations 129, that a first number of user devices are expected to be within the second coverage area of the second base station 305 during the first time period. The pre-caching engine 101 may determine, based on the forecasted content requests 127, that the second base station 305 is expected to participate in a first number of transmissions during the first time period. The pre-caching engine 101 may, in response to determining that the first number of transmissions fails to satisfy the network transmissions threshold 143, determine that the second base station 305 is expected to be busy during the first time period.

The pre-caching engine 101 may, in response to determining that the first user device 107 is expected to be within the second coverage area of the second base station 305 during a first time period, that the second base station 305 is expected to be busy during the first time period, that the first request time 174 occurs during the first time period, and that the first user device 107 is expected to be within the first coverage area prior to the first time period, indicate in the pre-caching schedule 121 that the particular media data 133 is to be pre-cached at the first user device 107. For example, the user device pre-cache indicator 161 may indicate that the first base station 103 is to provide the particular media data 133 to the first user device 107 prior to the first request time 174 while the first user device 107 is within the first coverage area.

The pre-caching schedule 121 may indicate that the particular media data 133 is to be requested from the content provider 104 prior to a request time when the particular media data 133 is to be pre-cached at a user device. For example, if the pre-caching schedule 121 indicates that the particular media data 133 is to be pre-cached at the first user device 107 (or the second user device 109), the pre-caching schedule 121 may indicate that the particular media data 133 is to be requested from the content provider 104 prior to the first request time 174 (or the second request time 194). For example, the pre-caching schedule 121 may indicate that the particular media data 133 is to be requested at (or by) the first time 147. The first time 147 may be prior to the first request time 174, the second request time 194, or both.

In a particular use case, the pre-caching engine 101 may determine that the first user device 107 is expected to be unreachable or within a coverage area of a busy base station at the first request time 174. The pre-caching engine 101 may pre-cache the particular media data 133 at the first user device 107. The system 300 may thus reduce data streaming interruptions when the first user device 107 is unreachable or within a coverage area of a busy base station by pre-caching the particular media data 133 at the first user device 107.

Figure 4:
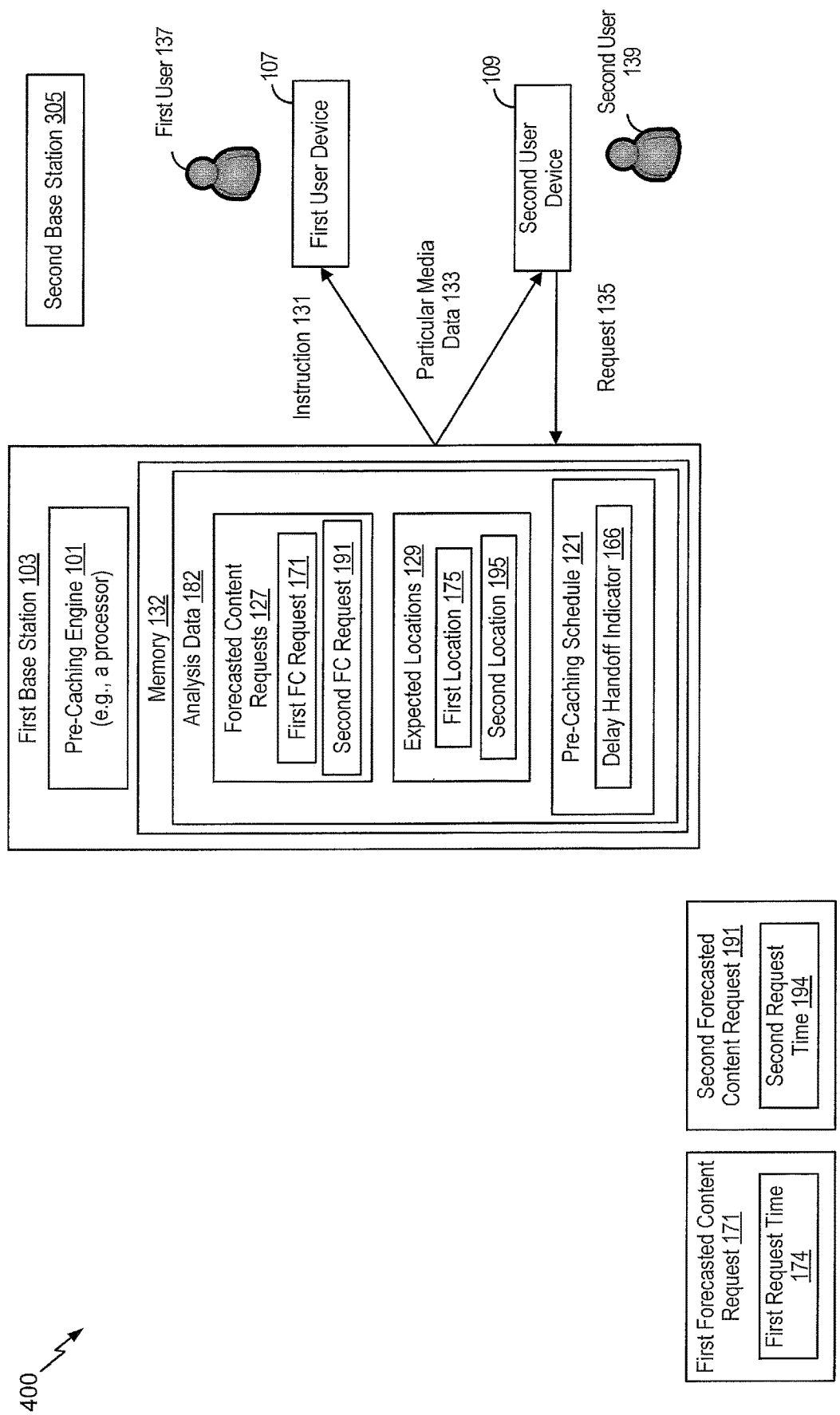
FIG. 4 is a diagram of another example of a system that generates a pre-caching schedule based on forecasted content requests.

Referring to FIG. 4, a particular illustrative aspect of a system is disclosed and generally designated 400. The system 400 may correspond to the system 100 of FIG. 1. For example, the system 100 may include one or more components of the system 400.

During operation, the pre-caching engine 101 may generate (or update) the pre-caching schedule 121 based on the forecasted content requests 127, the expected locations 129, or both, as described herein. The pre-caching engine 101 may, in response to determining that the first user device 107 is expected to be within a second coverage area of the second base station 305 during a first time period, that the second base station 305 is expected to be busy during the first time period, that the first request time 174 occurs during the first time period, and that the first user device 107 is expected to be within a first coverage area of the first base station 103 prior to the first time period, indicate in the pre-caching schedule 121 that the first base station 103 is to delay handoff of the first user device 107 to the second base station 305 until after the first request time 174. For example, the delay handoff indicator 166 may indicate that the first base station 103 is to delay handoff of the first user device 107 to the second base station 305 until after the first request time 174.

In a particular aspect, the first user device 107 may receive a weaker communication signal from the first base station 103 and a stronger communication signal from the second base station 305. The second base station 305 may be too busy to participate in a transmission with the first base station 103. The first base station 103 may delay handoff to the second base station 305. For example, the first base station 103 may provide the particular media data 133, via the weaker communication signal, to the first user device 107.

In a particular aspect, the pre-caching engine 101 may, in response to determining that the first base station 103 is to delay handoff of the first user device 107 to the second base station 305, indicate in the pre-caching schedule 121 that the particular media data 133 is to be pre-cached at the first user device 107, as described with reference to FIG. 3. For example, the user device pre-cache indicator 161 may indicate that the first base station 103 is to provide the particular media data 133 to the first user device 107 prior to a first time while the first user device 107 is within the first coverage area. The first time may correspond to a time that the first user device 107 is expected to move from the first coverage area to the second coverage area. The first time may correspond to a time that the first user device 107 is expected to transition from receiving a stronger signal from the first base station 103 to receiving a weaker signal from the first base station 103. A rate of bit transmission from the first base station 103 to the first user device 107 may decrease as the first user device 107 transitions from receiving the stronger signal to receiving the weaker signal. The first base station 103 may pre-cache at least a portion of the particular media data 133 at the first user device 107 while the first user device 107 is receiving the stronger signal from the first base station 103.

The system 400 may thus reduce data streaming interruptions when the first user device 107 is within a coverage area of a busy base station by delaying handoff to the busy base station, by pre-caching at least a portion of the data at the first user device 107 while the first user device 107 is receiving a stronger signal from the first base station 103, or both. The first user device 107 may continue to receive a remaining portion of the data via a weaker signal from the first base station 103.

Figure 5:
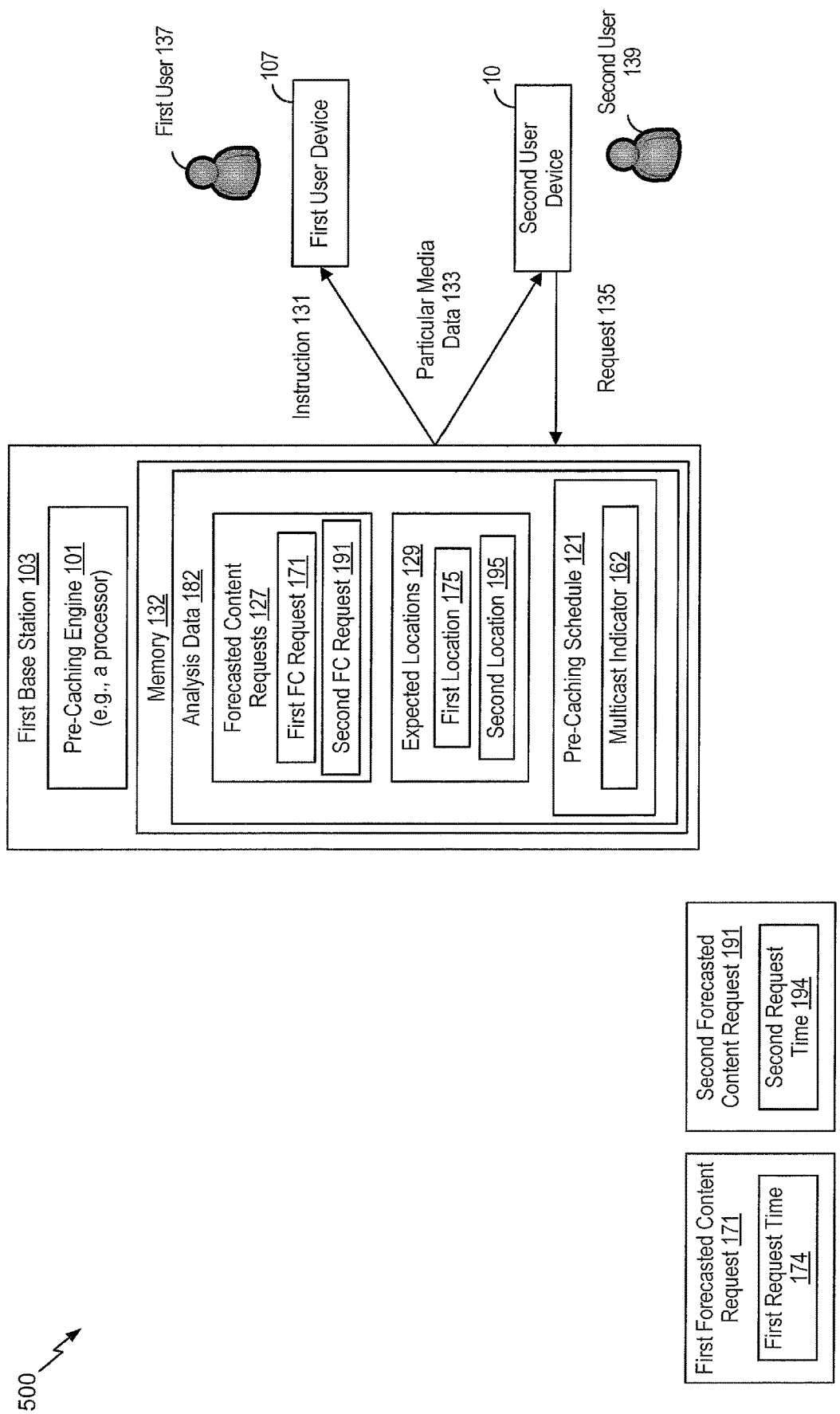
FIG. 5 is a diagram of another example of a system that generates a pre-caching schedule based on forecasted content requests.

Referring to FIG. 5, a particular illustrative aspect of a system is disclosed and generally designated 500. The system 500 may correspond to the system 100 of FIG. 1. For example, the system 100 may include one or more components of the system 500.

During operation, the pre-caching engine 101 may generate (or update) the pre-caching schedule 121 based on the forecasted content requests 127, the expected locations 129, or both, as described herein. The pre-caching schedule 121 may indicate whether the particular media data 133 is to be sent, via a multicast transmission, to multiple user devices, as described herein. The pre-caching engine 101 may determine that the first user device 107 and the second user device 109 are expected to be within the first coverage area of the first base station 103 at the second request time 194. For example, the first location 175 may indicate that the first user device 107 is expected to be within the first coverage area during a first time period, and the second location 195 may indicate that the second user device 109 is expected to be within the first coverage area during a second time period. The second request time 194 may occur during an overlapping portion of the first time period and the second time period.

The pre-caching engine 101 may, based at least in part on determining that the first user device 107 and the second user device 109 are expected to be within the first coverage area at the second request time 194 and that the first request time 174 is subsequent to the second request time 194, indicate in the pre-caching schedule 121 that the particular media data 133 is to be sent, via a multicast transmission, to the first user device 107 and the second user device 109 responsive to the request 135 from the second user device 109. For example, the pre-caching engine 101 may, in response to determining that the particular media data 133 is to be pre-cached at the first user device 107, that the second request time 194 is prior to the first request time 174, and that the first user device 107 and the second user device 109 are expected to be within the first coverage area at the second request time 194, indicate in the pre-caching schedule 121 that the particular media data 133 is to be provided, via a multicast transmission, to the first user device 107 and the second user device 109 responsive to the request 135. The multicast indicator 162 may indicate that the particular media data 133 is to be provided, via a multicast transmission, to the first user device 107 and the second user device 109 responsive to the request 135 from the second user device 109.

The system 500 may thus enable the pre-caching engine 101 to provide the particular media data 133 to the first user device 107 and to the second user device 109 using a single multicast transmission as compared to using multiple transmissions. Using fewer transmissions may reduce a number of data streaming interruptions by enabling a busy base station to provide data to a greater number of devices using a threshold number of transmissions.

Figure 6:
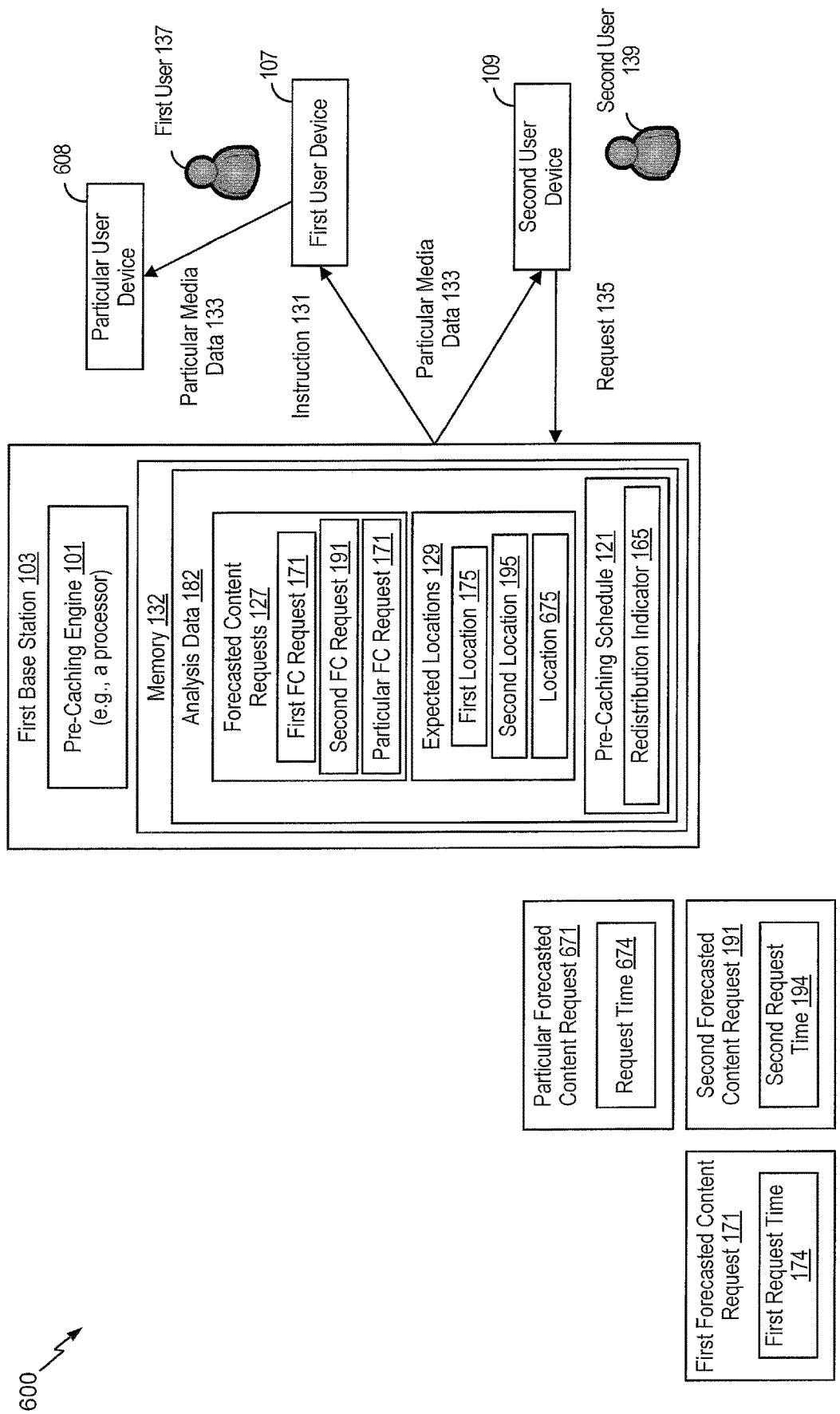
FIG. 6 is a diagram of another example of a system that generates a pre-caching schedule based on forecasted content requests.

Referring to FIG. 6, a particular illustrative aspect of a system is disclosed and generally designated 600. The system 600 may correspond to the system 100 of FIG. 1. For example, the system 100 may include one or more components of the system 600. The system 600 may include a particular user device 608.

During operation, the pre-caching engine 101 may generate (or update) the pre-caching schedule 121 based on the forecasted content requests 127, the expected locations 129, or both, as described herein. The pre-caching schedule 121 may indicate whether the particular media data 133 is to be re-distributed from a user device to another user device, as described herein. The forecasted content requests 127 may include a particular FC request 671 corresponding to the particular user device 608. The particular FC request 671 may indicate that the particular user device 608 is expected to request the particular media data 133 at a request time 674.

The pre-caching engine 101 may, in response to determining that the request time 674 is subsequent to the first request time 174 and that the particular user device 608 is expected to be within a coverage area of the first user device 107 at or prior to the request time 674, determine that the first user device 107 is to provide the particular media data 133 to the particular user device 608. For example, the redistribution indicator 165 may indicate that the first user device 107 is to provide the particular media data 133 to the particular user device 608 when the particular user device 608 is within a coverage area of the first user device 107.

In a particular aspect, the pre-caching engine 101 may, in response to determining that the request time 674 is subsequent to the second request time 194 and that the particular user device 608 is expected to be within a coverage area of the second user device 109 at or prior to the request time 674, determine that the second user device 109 is to provide the particular media data 133 to the particular user device 608. For example, the redistribution indicator 165 may indicate that the second user device 109 is to provide the particular media data 133 to the particular user device 608 when the particular user device 608 is within a coverage area of the second user device 109.

In a particular use case, the second user device 109 may receive the particular media data 133 from the first base station 103. The particular user device 608 may be unreachable via a base station or may be within a coverage area of a busy base station. The second user device 109 may, in response to determining that the particular user device 608 is within a coverage area of the second user device 109, provide the particular media data 133 to the particular user device 608.

The system 600 may thus reduce a number of data streaming interruptions by having the second user device 109 redistribute the particular media data 133 to other user devices (e.g., the particular user device 608). The particular user device 608 may continue to receive data from other user devices when the particular user device 608 is unreachable via a base station or is within a coverage area of a busy base station.

Figure 7:
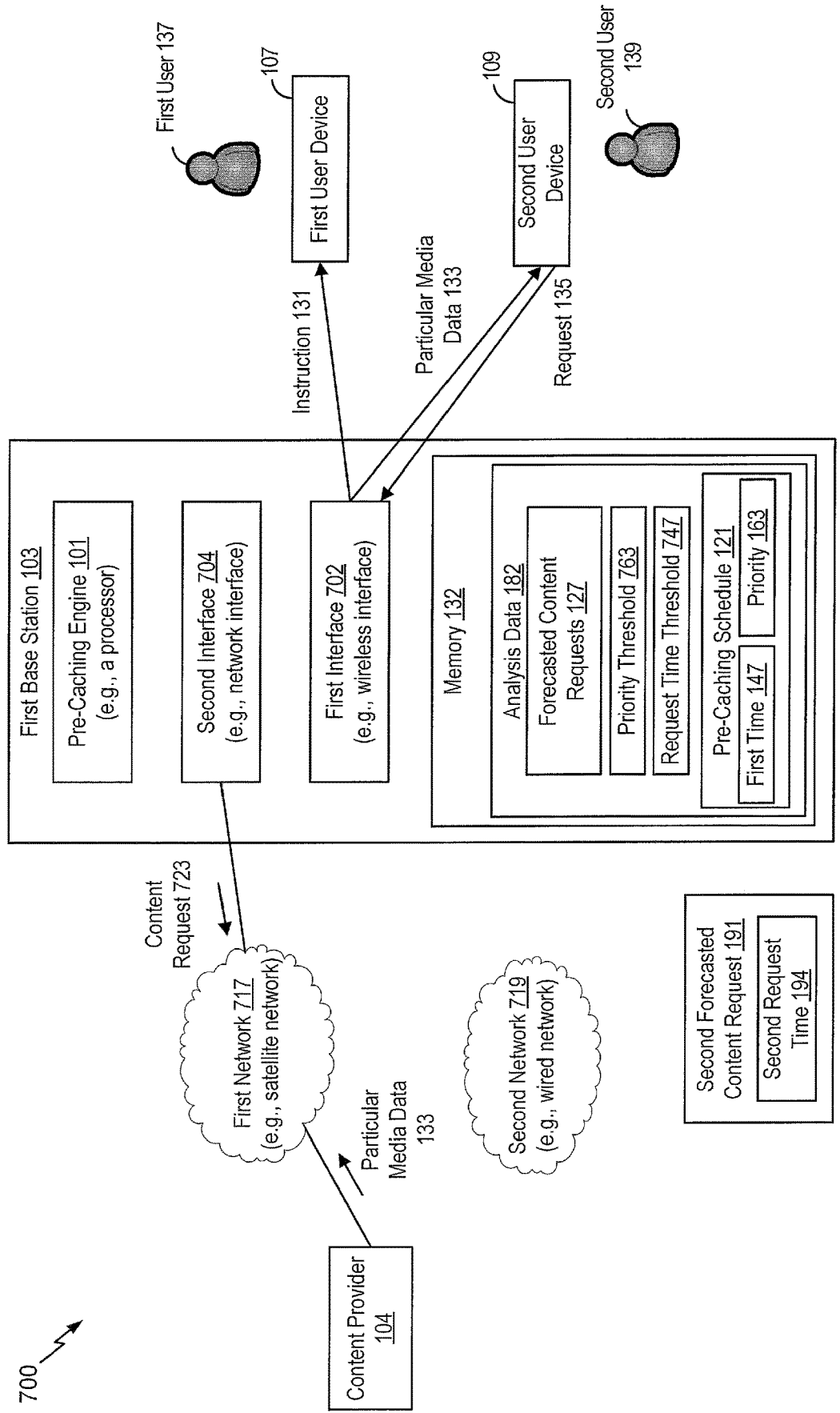
FIG. 7 is a diagram of another example of a system that generates a pre-caching schedule based on forecasted content requests.

Referring to FIG. 7, a particular illustrative aspect of a system is disclosed and generally designated 700. The system 700 may correspond to the system 100 of FIG. 1. For example, the system 100 may include one or more components of the system 700. The first base station 103 may include a first interface 702 (e.g., a wireless interface), a second interface 704 (e.g., a network interface), or both. The first interface 702 may be configured to communicate with the first user device 107, the second user device 109, or both. The second interface 704 may be configured to communicate, via a first network 717 (e.g., a satellite network), to the content provider 104. The second interface 704 (or another interface of the first base station 103) may be configured to communicate, via a second network 719 (e.g., a wired network), to the content provider 104.

The pre-caching schedule 121 may indicate that the first base station 103 is to request the particular media data 133 from the content provider 104 by the first time 147. In a particular aspect, the particular media data 133 may be outdated by the first time 147 if the particular media data 133 is requested too far ahead of time. In an alternate aspect, the particular media data 133 may correspond to relatively static data that remains unchanged over time. The first base station 103 may prioritize requesting dynamic data over static data. The dynamic data may be requested close to a corresponding first time indicated in the pre-caching schedule 121. Static data may be requested prior to a corresponding first time in an available time slot after processing requests corresponding to the dynamic data.

The second network 719 may have lower latency, greater bandwidth, higher cost, or a combination thereof, than the first network 717. The pre-caching engine 101 may balance costs and latency. For example, the pre-caching engine 101 may reduce costs by sending content requests via the first network 717 or may reduce latency by sending content requests via the second network 719.

During operation, the pre-caching engine 101 may, in response to determining, at a particular time, that a difference between the particular time and the first time 147 is within a threshold, determine that the content request 723 is to be sent to the content provider 104. In a particular aspect, the particular media data 133 may be outdated by the first time 147 if the particular media data 133 is requested too far ahead of time. In this aspect, the threshold may indicate a low difference between the particular time and the first time 147. In an alternate aspect, the particular media data 133 may correspond to relatively static data that remains unchanged over time. In this aspect, the threshold may indicate a greater difference between the particular time and the first time 147 to enable the first base station 103 to send the content request 723 at an available time prior to the first time 147.

The pre-caching engine 101 may, in response to determining that the content request 723 is to be sent to the content provider 104, select a network from a plurality of networks based on the second request time 194, the priority 163, or both. For example, the pre-caching engine 101 may select, at a particular time, the first network 717 in response to determining that a difference between the particular time and the second request time 194 satisfies (e.g., is greater than) a request time threshold 747, that the priority 163 satisfies (e.g., is less than) a priority threshold 763, or both. To illustrate, the pre-caching engine 101 may select the first network 717 having a lower cost when the particular media data 133 can be received by the second request time 194 given the higher latency of the first network 717.

Alternatively, the pre-caching engine 101 may select, at the particular time, the second network 719 in response to determining that the difference between the particular time and the second request time 194 fails to satisfy (e.g., is less than or equal to) the request time threshold 747, that the priority 163 fails to satisfy (e.g., is greater than or equal to) the priority threshold 763, or both. For example, the pre-caching engine 101 may select the second network 719 having a higher cost when the particular media data 133 can be received by the second request time 194 given the lower latency of the first network 717.

The pre-caching engine 101 may send the content request 723, via the second interface 704 and the selected network (e.g., the first network 717), to the content provider 104. The content provider 104 may, in response to receiving the content request 723, send the particular media data 133 via the selected network (e.g., the first network 717) to the first base station 103. The pre-caching engine 101 may transmit, via the first interface 702, the particular media data 133 to the first user device 107, the second user device 109, or both, as described with reference to FIG. 1.

The system 700 may thus enable the pre-caching engine 101 to balance cost and latency associated with receiving the particular media data 133 via the first network 717 and the second network 719. The pre-caching engine 101 may reduce costs by requesting the particular media data 133 via the first network 717 or may reduce latency by requesting the particular media data 133 via the second network 719.

Figure 8:
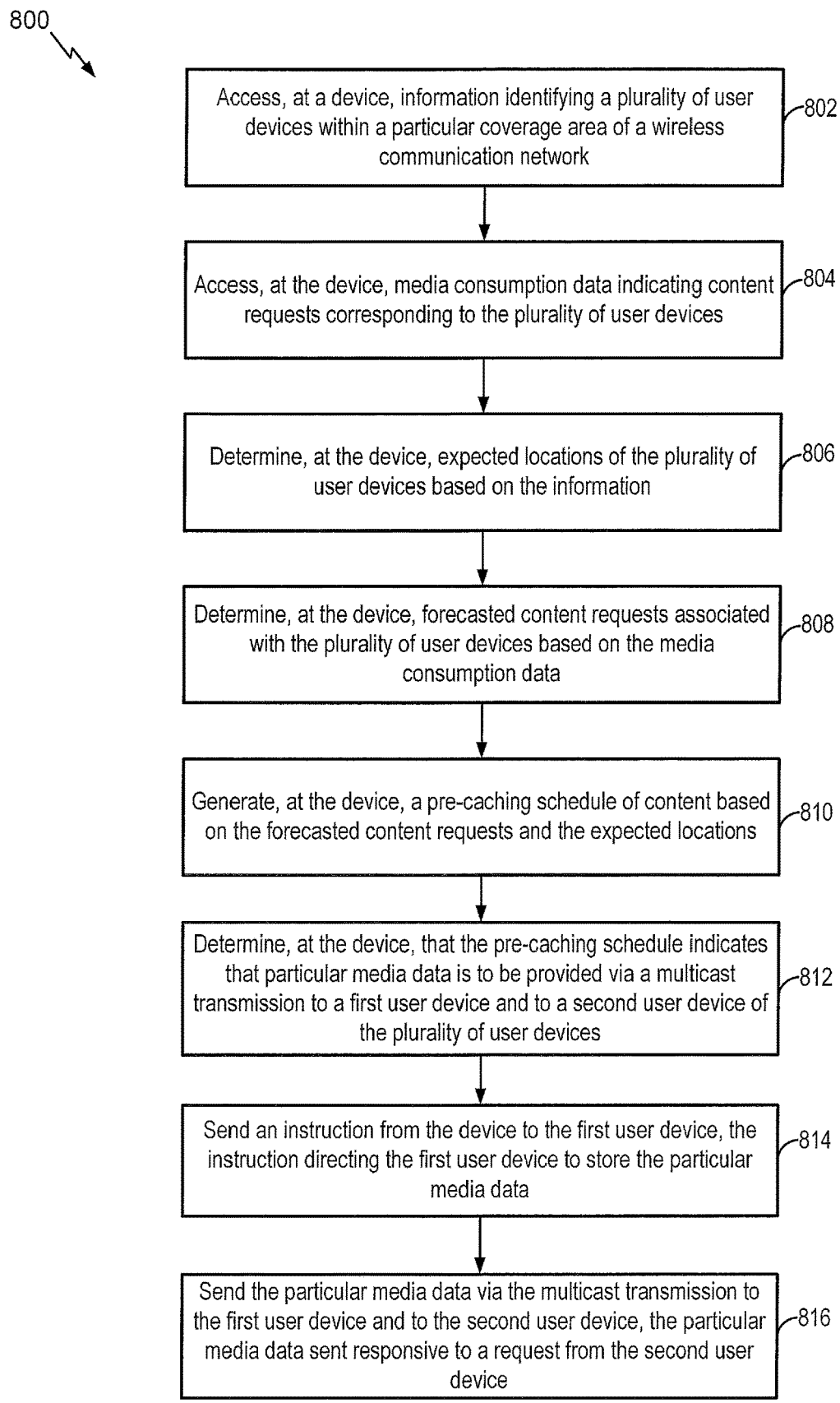
FIG. 8 is a flowchart to illustrate a particular aspect of a method of generating a pre-caching schedule based on forecasted content requests.

FIG. 8 is a flowchart to illustrate a particular aspect of a method 800 of generating a pre-caching schedule based on forecasted content requests. In an illustrative aspect, the method 800 may be performed by the pre-caching engine 101, the first base station 103 of FIG. 1, the systems 100-700 of FIGS. 1-7, or a combination thereof.

The method 800 includes accessing, at a device, information identifying a plurality of user devices within a particular coverage area of a wireless communication network, at 802. For example, the first base station 103 of FIG. 1 may access the user device information 125 identifying a plurality of user devices (e.g., the first user device 107 and the second user device 109) within a particular coverage area of a wireless communication network.

The method 800 also includes accessing, at the device, media consumption data indicating content requests corresponding to the plurality of user devices, at 804. For example, the first base station 103 of FIG. 1 may access the media consumption data 123 indicating content requests corresponding to the plurality of user devices (e.g., the first user device 107 and the second user device 109).

The method 800 further includes determining, at the device, expected locations of the plurality of user devices based on the information, at 806. For example, the pre-caching engine 101 of the first base station 103 of FIG. 1 may determine the expected locations 129 of the plurality of user devices (e.g., the first user device 107 and the second user device 109) based on the user device information 125, as described with reference to FIG. 1.

The method 800 also includes determining, at the device, forecasted content requests associated with the plurality of user devices based on the media consumption data, at 808. For example, the pre-caching engine 101 of the first base station 103 of FIG. 1 may determine the forecasted content requests 127 associated with the plurality of user devices (e.g., the first user device 107 and the second user device 109) based on the media consumption data 123, as described with reference to FIG. 1. To illustrate, the media consumption data 123 may indicate that the first user 137 requested particular content at a particular time at least a threshold number of times over a particular time period (e.g., a previous one week). The pre-caching engine 101 may generate the first FC request 171 indicating that the first user device 107 is expected to request the particular media data 133 at the first request time 174, as described with reference to FIG. 1. For example, the pre-caching engine 101 may generate the first FC request 171 in response to determining that the first user 137 requested the particular media data 133 at a particular time at least a threshold number of times over a particular time period (e.g., a previous one week).

The method 800 further includes generating, at the device, a pre-caching schedule of content based on the forecasted content requests and the expected locations, at 810. For example, the pre-caching engine 101 of the first base station 103 of FIG. 1 may generate the pre-caching schedule 121 based on the forecasted content requests 127 and the expected locations 129, as described with reference to FIG. 1.

The method 800 also includes determining, at the device, that the pre-caching schedule indicates that particular media data is to be provided via a multicast transmission to a first user device and to a second user device of the plurality of user devices, at 812. For example, the pre-caching engine 101 of the first base station 103 of FIG. 1 may determine that the multicast indicator 162 of the pre-caching schedule 121 indicates that the particular media data 133 is to be provided via a multicast transmission to the first user device 107 and to the second user device 109.

The method 800 further includes sending an instruction from the device to the first user device, at 814. For example, the pre-caching engine 101 of the first base station 103 of FIG. 1 may send the instruction 131 from the first base station 103 to the first user device 107, as described with reference to FIG. 1. The instruction 131 may direct the first user device 107 to store the particular media data 133.

The method 800 also includes sending the particular media data via the multicast transmission to the first user device and to the second user device, at 816. For example, the pre-caching engine 101 of FIG. 1 may send the particular media data 133 via a multicast transmission to the first user device 107 and to the second user device 109, as described with reference to FIG. 1. The particular media data 133 may be sent responsive to the request 135 from the second user device 109.

The method 800 may enable generation of the pre-caching schedule 121 based on the forecasted content requests 127. The pre-caching engine 101 may provide the particular media data 133 to multiple user devices at the same time using a multicast transmission.

Figure 9:
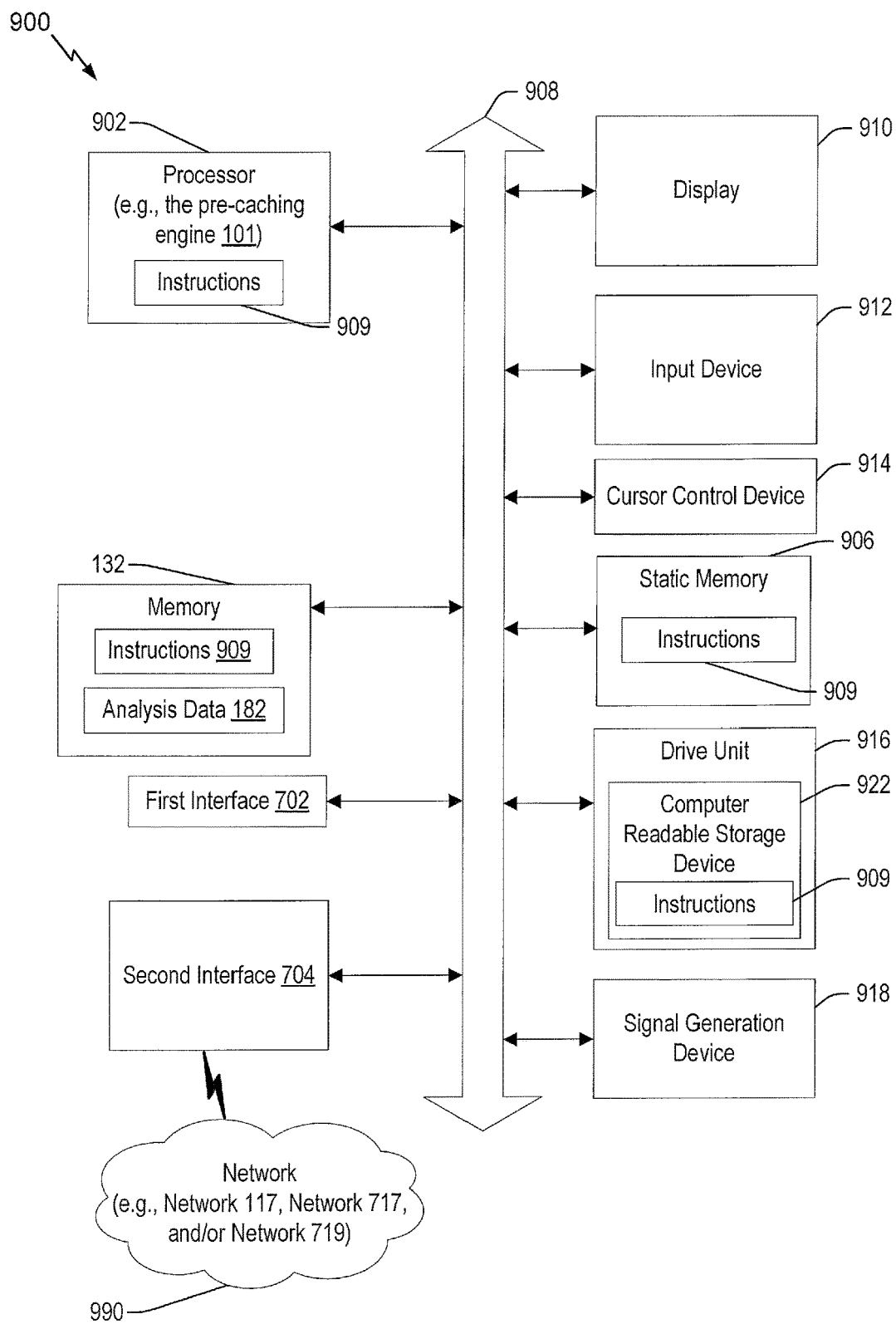
FIG. 9 is a block diagram of a general computer system operable to support computer-implemented methods, computer program products, and system components as illustrated in FIGS. 1-8.

FIG. 9 is a block diagram illustrating an aspect of a general computer system that is generally designated 900. The computer system 900 may be operable to support aspects of computer-implemented methods, computer program products, and system components as illustrated in FIGS. 1-8. In a particular aspect, the computer system 900 may correspond to the first base station 103 of FIG. 1. The computer system 900 may be coupled to, or in communication with, other computer systems or peripheral devices.

The computer system 900 may be implemented as or incorporated into various devices, such as a tablet computer, a personal digital assistant (PDA), a palmtop computer, a laptop computer, a smart phone, a communications device, a web appliance, a display device, a computing device, a wearable computing device, a watch, a health monitoring device, or any other machine capable of executing a set of instructions (sequential or otherwise) that specify actions to be taken by that machine. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 includes a processor 902, e.g., a central processing unit (CPU). In a particular aspect, the processor 902 may correspond to the pre-caching engine 101 of FIG. 1. In a particular aspect, the processor 902 may include multiple processors. For example, the processor 902 may include distributed processors, parallel processors, or both. The multiple processors may be included in, or coupled to, a single device or multiple devices. The processor 902 may include a virtual processor. In a particular aspect, the processor 902 may include a state machine, an application specific integrated circuit (ASIC), or a programmable gate array (PGA) (e.g., a field PGA).

Moreover, the computer system 900 may include a main memory (e.g., the memory 132 of FIG. 1) and a static memory 906 that may communicate with each other via a bus 908. The main memory 132, the static memory 906, or both, may include the instructions 909. The instructions 909, when executed by the processor 902, may cause the processor 902 to perform one or more operations described with reference to the systems and methods of FIGS. 1-8. As shown, the computer system 900 may further include or be coupled to a display unit 910, such as a liquid crystal display (LCD), an organic light emitting diode (OLED), a flat panel display, a solid-state display, or a projection display. Additionally, the computer system 900 may include an input device 912, such as a keyboard, a remote control device, a camera, a microphone, or a combination thereof, and a cursor control device 914, such as a mouse. In a particular aspect, the cursor control device 914 may be incorporated into the remote control device. The computer system 900 may also include a disk drive unit 916, a signal generation device 918, such as a speaker, the first interface 702, and the second interface 704. The first interface 702 may be configured to communicate with user devices (not shown). For example, the first interface 702 may be configured to communicate with the first user device 107, the second user device 109 of FIG. 1, the particular user device 608 of FIG.

6, or a combination thereof. The second interface 704 may be coupled to other devices (not shown) via a network 990. For example, the second interface 704 may be coupled to the server 102, the content provider 104, or both. The network 990 may include the network 117, the first network 717, the second network 719, or a combination thereof. In a particular aspect, one or more of the components of the computer system 900 may correspond to, or be included in, the first base station 103 of FIG. 1.

In a particular aspect, as depicted in FIG. 9, the disk drive unit 916 may include a tangible computer-readable storage device 922 in which one or more sets of instructions 909, e.g. software, may be embedded. Further, the instructions 909 may embody one or more of the methods or logic as described herein. In a particular aspect, the instructions 909 may reside completely, or at least partially, within the memory 132, the static memory 906, and/or within the processor 902 during execution by the computer system 900. The processor 902 may execute the instructions 909 to perform operations corresponding to one or more of the methods or logic as described herein. The processor 902 may perform the operations directly, or the processor 902 may facilitate, direct, or cooperate with another device or component to perform the operations.

In an alternative aspect, dedicated hardware implementations, such as application specific integrated circuits, programmable logic arrays and other hardware devices, can be constructed to implement one or more of the methods described herein. Applications that may include the apparatus and systems of various aspects can broadly include a variety of electronic and computer systems. One or more aspects described herein may implement functions using two or more specific interconnected hardware modules or devices with related control, or as portions of an application-specific integrated circuit. Accordingly, the present system encompasses software, firmware, and hardware implementations.

In accordance with various aspects of the present disclosure, the methods described herein may be implemented by software programs executable by a computer system. Further, in an exemplary, non-limiting aspect, implementations can include distributed processing and parallel processing. Alternatively, virtual computer system processing can be used to implement one or more of the methods or functionality as described herein.

The present disclosure describes a computer-readable storage device that includes instructions 909 to enable pre-caching schedule generation based on forecasted content requests. Further, the instructions 909 may be transmitted or received via the first interface 702, over the network 990 via the second interface 704, or both (e.g., via uploading and/or downloading of an pre-caching schedule generation application or program, or both).

While the computer-readable storage device is shown to be a single device, the term "computer-readable storage device" includes a single device or multiple devices, such as centralized or distributed storage, and/or associated caches that store one or more sets of instructions. The term "computer-readable storage device" shall also include any device that is capable of storing a set of instructions for execution by a processor or that causes a computer system to perform any one or more of the methods or operations disclosed herein.

In a particular non-limiting, exemplary aspect, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes. A computer-readable storage device is an article of manufacture and is not a signal.

It should also be noted that software that implements the disclosed methods may be stored on a storage device, such as: a disk or tape; a magneto-optical or optical device, such as a disk; or a solid state device, such as a memory card or other package that houses one or more read-only (non-volatile) memories, random access memories, or other re-writable (volatile) memories.

Although the present specification describes components and functions that may be implemented in particular aspects with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions. Accordingly, replacement standards and protocols having the same or similar functions as those disclosed herein are considered equivalents thereof.

Moreover, although specific aspects have been illustrated and described herein, it should be appreciated that any subsequent arrangement designed to achieve the same or similar purpose may be substituted for the specific aspects shown. This disclosure is intended to cover any and all subsequent adaptations or variations of various aspects. Combinations of the above aspects, and other aspects not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single aspect for the purpose of streamlining the disclosure. This disclosure is not to be interpreted as reflecting an intention that the claimed aspects have more features than are expressly recited in each claim. As the following claims reflect, inventive subject matter may be directed to less than all of the features of any of the disclosed aspects. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other aspects, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method facilitated by a base station of a wireless communications network, the method comprising:
   accessing, at the base station, information identifying a plurality of user devices in a coverage area of the base station;
   determining, at the base station, a forecasted content request for media content at a particular time for delivery to a first user device of the plurality of user devices based on media consumption data for the first user device;

receiving, at the base station from a second user device of the plurality of user devices, a request for the media content at a time before the particular time;

sending, from the base station to the first user device, an instruction, the instruction directing the first user device to store the media content received via a multicast transmission of the media content; and sending the media content via the multicast transmission from the base station to the first user device and to the second user device responsive to the request.

2. The method of claim 1, further comprising adding an entry to a pre-cache schedule to deliver the media content to the first user device at a first time, wherein the time occurs before the first time.

3. The method of claim 2, wherein the entry is added to the pre-cache schedule based on a determination by the base station that the first user device will be at an expected location that is unreachable by the base station at the particular time.

4. The method of claim 3, wherein the expected location is determined based on navigation data, calendar data, travel history data, or a combination thereof, associated with the first user device.

5. The method of claim 2, wherein the entry is added to the pre-cache schedule based on a determination by the base station that the first user device will be at an expected location in a particular coverage area of a particular base station at the particular time, wherein the particular base station is predicted to be busy at the particular time.

6. The method of claim 2, further comprising adding a second entry to the pre-cache schedule to retrieve and store the media content at the base station at a second time before the first time.

7. The method of claim 6, further comprising determining a retention time for storage of the media content at the base station based on a cache management parameter for the base station.

8. The method of claim 1, wherein the base station is configured to retrieve the media content from a content source via a first network characterized by a first latency and by a second network characterized by a second latency lower than the first latency.

9. The method of claim 8, wherein the base station utilizes the first network to cache the media content at the base station.

10. The method of claim 8, wherein the base station utilizes the second network to retrieve the media content based on the request.

11. An apparatus comprising:
a processor; and
a memory in communication with the processor, the memory including instructions executable by the processor to perform operations, the operations comprising:
accessing information identifying a plurality of user devices in a coverage area of a base station of a wireless communications network;
determining a forecasted content request for media content at a particular time for a first user device of the plurality of user devices based on media consumption data for the first user device;
receiving, from a second user device of the plurality of user devices, a request for the media content at a time before the particular time;
sending an instruction to the first user device, the instruction directing the first user device to store the media content received via a multicast transmission of the media content; and
sending the media content via the multicast transmission to the first user device and to the second user device responsive to the request.

12. The apparatus of claim 11, wherein the operations further comprise retrieving the media consumption data from a server.

13. The apparatus of claim 11, wherein the operations further comprise adding an entry to a pre-cache schedule to deliver the media content to the first user device at a first time, wherein the time occurs before the first time.

14. The apparatus of claim 11, wherein the instruction is sent to a plurality of devices scheduled in a pre-cache schedule to receive the media content.

15. A non-transitory computer-readable storage medium storing instructions executable by a processor to perform operations, the operations comprising:
accessing information identifying a plurality of user devices in a first coverage area of a first base station of a wireless communications network;
determining a forecasted content request for media content at a particular time for a first user device of the plurality of user devices based on media consumption data for the first user device;
determining an expected location of the first user device at the particular time, the expected location associated with a second coverage area of a second base station; and
in response to a determination that the second base station of the wireless communications network is expected to be busy during a first time period that includes the particular time, scheduling the first base station to transmit the media content to the first user device starting at a second time during a second time period that the first user device is expected to remain in the first coverage area of the first base station.

16. The non-transitory computer-readable storage medium of claim 15, wherein the operations further comprise sending the media content to the first user device at the second time.

17. The non-transitory computer-readable storage medium of claim 15, wherein the operations further comprise:
receiving a request for the media content from a second user device before the second time; and
multicasting the media content to the first user device and the second user device responsive to the request.

18. The non-transitory computer-readable storage medium of claim 17, wherein the operations further comprise sending an instruction to the first user device responsive to the request, the instruction directing the first user device to store the media content received via a multicast transmission of the multicasting of the media content.

19. The non-transitory computer-readable storage medium of claim 15, wherein the operations further comprise determining the expected location based on first user device information retrieved from a server.

20. The non-transitory computer-readable storage medium of claim 19, wherein the first user device information includes navigation data, calendar data, travel history data, or a combination thereof.

* * * * *